(12) United States Patent
Clarke

(10) Patent No.: X5948
(45) Date of Patent: May 7, 1830

(54) LOOM, CARPET

(76) Inventor: Josiah R. Clarke

Josiah R Clark
Letters Patent

The Schedule referred to in these Letters Patent and making part
of the same containing a description in the words of the said Josiah
R Clark himself of his improvement in that part of an ingrain
Carpet Loom called the Engine which forms the figures or ornaments This improvement consists in substituting a rotary sheet of Paste
Board parchment painted Canvafs. or any other suitable substance
perforated with holes in such a manner as to form the figure re
quired in lieu of the barrel or cylinder with wire cogs or sta.
ples set in it (somewhat resembling the barrel of a hand organ)
which is commonly used, and also as a substitute for an im
provement on the "lay card machine" so called, or as it is some
times called, "the paper machine" and also as an improvement
on the Canvafs apron with cogs or strips of wood attached to
it and with Staples set in these cogs. which has been recent-
ly brought into use - The sheet of Paste Board &c. required
will be of various size according to the design of the figure
to be laid out upon it, but always of a breadth about
equal to the length of the cylinders or cylinder around which the
sheet is to operate. & on this sheet is to be laid out the design
for the figures to be woven by it in the same manner as the surface
of the cylinder or barrel is usually laid out for the setting of the
wire cogs. or staples & in every place where a wire cog would
be set in the cylinder punch or cut a fair hole thro the paste board
and all these holes in equi distant lines acrofs the paste board. and
beside the holes which are laid out to form the figure punch
other holes near each edge of the paste board in about every sec
ond or third line of the figure holes. This sheet being thus prepared
may be conveniently applied and used in the following man
ner (viz) place a small cylinder of any convenient diameter and of such length as the work requires, say from 21. to 38 inches long in the
same place, or nearly in the same place of the large barrel or cylinde
commonly used. This small cylinder is to be fluted or grooved
from end to end, with grooves about half an inch deep and just
as near together as the lines of holes across the paste board are. i
every second or third groove, near each end of the cylinder, drive a
pin of wire having a blunt point rising somewhat above the surf.
of the cylinder and standing in right lines around it like
spur cogs, and exactly corresponding with the edge holes in the
paste board. at a suitable distance behind this fluted roller cy
inder and parallel to it, place another plain cylinder aroun
both ~~of~~ these cylinders wrap the sheet of paste board and lace
tack the two ends together, or as nearly together as .... may be
in the manner of a rotary apron, or creeper. the rows of holes, in t
edges of which suit to the rows of pins in the fluted cylinder an
by which it is regularly moved forward and backward in the sam
manner, and by similar machinery to that which is in common use
In all "pointed" or "gathered" patterns it is best to move the apr
forward for the first half of the figure and backwards for the seco
half, but in all "sprigg" or "cumber" patterns it is best to move the a
pron perpetually forward in the same manner as is known and prac
tised by all carpet weavers. In the barrel or cylinder Engine the
pins or staples are so arranged, that the wire slides commonly ca
ed "Leaves" which govern the threads of the warp, slide towards
the cylinder at every "hand" or double throw of the shuttle & a part
of these slides or leaves meeting with the pins, are obstructed i
their course toward the centre of the barrel and the number thu
obstructed determines the number of threads of warp, which
shall be thrown over the surface of the webb from time to time
as the weaving progresses to form the figures and a cylinder or b
rel with pins differently arranged is requisite for each diffe
ently figured pattern But this improvement is different, in that the leaves or slides which mate with the holes thro' the pasteboard are per-
mitted to pass inward by entering into the grooves in the smaller cylinder
and so determine the number and arrangement of the threads of the
warp which shall be thrown upon the surface to constitute the
figures. There are however not only several different substances which
may answer nearly as well as paste board, but also several differ
ent arrangements not differing essentially from that more par-
ticularly described, especially that instead of having the perforated
apron pass around 2 cylinders in an elliptical form as before de-
scribed, it may be bound fast upon the surface of a large cylinder
grooved as aforesaid, the grooves being just as far apart as the
rows or lines of holes in the apron, but in this arrangement there
will be no need of so many holes at the edges as in the former
case, and this cylinder may take the same place and be moved
by the same machinery, and in the same manner as the common
barrel with pins in it is moved. In this arrangement as well
as the foregoing, the same cylinder continues always on the Engine
and the coverings only are changed to operate all the variety of
Patterns. In fine the only things which I claim as improvements
are the rotary apron perforated so as to perform the figure (upon prin-
ciples already in use) and as being much cheaper, more simple, more
sure to be in order, more easily shifted and requiring less attention
in foremanship than the barrel with pins or staples, the canvass
with staples or any other method of forming the figures in car-
pet Engines now in use and also the fluted or grooved cylinder
upon which the perforated apron operates.

Witnesses
Ambrose Whiting }
Asa Barber }

Josiah K. Clark

Exd. W.E.

Patented May 7. 1830.—

(1144 words)